United States Patent [19]

Müller et al.

[11] 3,967,028

[45] June 29, 1976

[54] SEALED FOAM WEB

[75] Inventors: Heinz Müller, Hamburg; Bodo Szonn, Pinneberg; Peter Jauchen; Rolf Schulze, both of Hamburg, all of Germany

[73] Assignee: Beiersdorf Aktiengesellschaft, Hamburg, Germany

[22] Filed: Dec. 12, 1974

[21] Appl. No.: 532,109

[30] Foreign Application Priority Data
Dec. 21, 1973 Germany.............................. 2363802

[52] U.S. Cl................................ 428/214; 427/244; 427/407; 428/315; 428/354; 428/424; 428/425
[51] Int. Cl.² ........................................... B32B 3/26
[58] Field of Search................ 161/159, 160, 161; 156/77, 78, 246, 307, 308; 428/310, 315, 354, 424, 425, 213, 214; 427/407, 244

[56] References Cited
UNITED STATES PATENTS

| | | | |
|---|---|---|---|
| 3,039,907 | 6/1962 | Scholl | 161/160 |
| 3,400,196 | 9/1968 | Le Roy | 161/160 |
| 3,563,845 | 2/1971 | Stevens | 161/160 |
| 3,607,602 | 9/1971 | Greskiewicz | 161/160 |
| 3,650,880 | 3/1972 | Tieniber | 161/159 |
| 3,788,882 | 1/1974 | Noone | 161/159 |
| 3,794,548 | 2/1974 | Wirth et al | 161/159 |

*Primary Examiner*—William J. Van Balen
*Attorney, Agent, or Firm*—Bierman & Bierman

[57] ABSTRACT

A web of polymeric foam which is sealed on one or both sides by a thin, hard plastic layer is disclosed. The sealed web is prepared by coating an auxiliary substrate with a film of hard plastic-forming resin, laminating this film to a polymeric foam web by means of a curable adhesive applied to the hard plastic, and removing the auxiliary substrate.

8 Claims, No Drawings

SEALED FOAM WEB

The present invention relates to foam webs, sealed with a durable, hard plastic layer or veneer on the surface of one or both sides. The invention relates in particular to polyurethane foam webs, the method for their production, and their use as support material for adhesive tapes which are adhesive on one or both sides.

Since their development in the 1940's polyurethane foam materials have attained great commerical importance. For most applications great value is attached to their elastic behavior, which is largely reversible. It is known that deformation behavior can be controlled, depending on the purpose of use, by adjusting the volumetric density, the degree of crosslinkage, and by the polyols and isocyanates employed. A disadvantage of these foams, however, is their relatively great susceptibility to the action of chemicals, water and light. For instance, polyester-based polyurethane foams are hydrolyzed by water and elevated temperatures leading to the destruction of the foam structure. Under the action of light, the polyester as well as the polyether urethanes are gradually degraded and lose their elastic properties.

Foam materials which are usually cut into webs of varying thicknesses must thereofore subsequently be provided with a protective layer. This protective layer, which should be as thin as possible in relation to the thickness of the foam material so as not to alter its characteristic properties, also serves as a barrier layer in relation to another layer to be applied, for example a self-adhesive composition. Hence the adhesive does not come into contact with the polyurethane.

For this purpose it is known to provide foam webs with a plastic layer by applying a solution or dispersion by direct spreading or by transfer application from an auxiliary support. Especially in the case of thin webs, however, this method leads to inferior products because the coating compositions penetrate into the openpore foam material.

To avoid these disadvantages, it is known to initially spread the film-forming substances on an auxiliary support. This permits (a) evaporation of the solvent in the case of solvent-containing substances or, (b) for solvent-free compositions, gelling or crosslinking until the viscosity has greatly increased. The still tacky layer is then applied to the foam material by reversing or transfer. In a subsequent heating process residual solvents are removed, or crosslinking or gelling carried out to completion.

While this method furnishes foam webs sufficient for some purposes, such products are not suitable for high physical or chemical stresses requiring an extremely smooth and pore-free surface of the foam. There are several reasons why this is so. During the heating of the unfinished laminate a plurality of small bubbles and stress points are formed which lead in part to the lifting of the foam web from the film-forming layer. This is attributable to the different expansion behavior of the foam material and the gases entrapped therein. If the coating composition contains residual solvent, additional bubble formation occurs during evaporation. If attempts are made to remove these bubbles by subsequent rolling under pressure, hair-line fissures and pores result in the thin layer. A perfect, mirror-polished surface, which is particularly necessary to serve as substrate for a maximum active bonding surface does not result.

Accordingly, it is an object of the present invention to improve the surface of foam material webs, preferably polyurethane foam webs, by providing them with a protective layer, such that their aging resistance under influences such as water and light is substantially improved, while simultaneously retaining their good deformation and mechanical behavior. At the same time it was an object of this invention to select the construction and composition of the protective layer and to apply it in such a manner than the foam webs are suitable as support material for strips or webs which are self-adhesive on one or both sides and able to withstand very high loads.

It has now been found that these requirements are fulfilled by foam webs, in particular polyurethane foam webs, which are covered on one or both sides with a thin durable plastic layer which is bonded to the foam surface by means of an elastic intermediate layer.

Examples of durable plastic layers are veneers based on melamine resins, possibly in combination with alkyd resins or on ureaformaldehyde resins, which are characterized by high aging resistance and stability. The thickness of this layer should generally be only a few microns, preferably 2–5 microns, in order not to impair the elastic and flexible behavior of the foam material.

For the formation of the elastic intermediate layer which joins the veneer to the foam material, polymer compositions can be used which react to a final, elastic, non-tacky state only after spreading on the support material and which react chemically with the foam as well as with the plastic layer. In this way a particularly resistance product is obtained. Especially suitable for this purpose are polyurethane-forming mixtures which react in situ.

As stated supra, known methods for the production of foam materials covered on one or both sides with a film-forming layer are not suitable for the production of foam webs having the high degree of quality of the present invention. Hence, another object of the present invention is to provide a technologically feasible and effective process.

This problem is solved by the present invention. Briefly, it comprises a method for producing foam webs, in particular polyurethane foam webs, sealed on one or both sides, which is characterized in that a thin durable plastic layer, preformed on an auxiliary support, is bonded to the foam web by means of an intermediate elastic layer applied to the durable plastic layer, by simultaneously bringing the webs to an elevated temperature, laminating them without temperature difference between the materials, and removing the auxiliary support from the cover layer after bonding is complete.

According to a preferred embodiment of this invention a solvent-containing veneer, preferably a melamine resin blended with an alkyd resin, or a ureafromaldehyde resin, is applied to an auxiliary support, such as a polyethylene terephthalate foil. A spreader which is adjustable to a high degree of accuracy is used for this purpose. The veneer is spread to provide a dry thickness of up to 10 microns, 2 to 5 microns being most preferred. The veneer is dried at temperatures of about 100°–120°C, the solvents thus being driven off, while holding to a minimum any cross-linkage. The dried veneer or lacquer-layer, only slightly superficially crosslinked, can then be coiled together with the auxiliary support or sent directly to further processing.

In the next process step, a preferably solvent-free, reactive two-component laminating composition based on a hydroxyl group-containing polyether and a mixture of long-chain aliphatic diisocyanates largely insensitive to water is applied to the lacquer layer in a thickness of up to about 70 microns, in particular 5–30 microns. As the laminating composition must be very reactive for efficient operation, the individual components — hydroxyl compound, isocyanate and accelerator — are added to the applicator with a proportioning system and applied continuously. The laminating composition penetrates somewhat into the not yet fully hardened and therefore still swellable lacquer layer and thereby prevents the formation of a weakly bonded sharp boundary between the two layers.

The hardening of the laminating composition is carried out in a downstream drying duct by feeding heated air to the extent that the gel state is reached. Preferably, about two thirds of the crosslinkage potential still remains. Simultaneously with the introduction of the auxiliary support coated with the reactive laminating composition into the heated drying duct, the polyurethane foam to be coated is conducted into the drying duct via a second web transport. Thus the two webs run parallel in the duct over a distance of several meters. This simultaneous web conduction through the duct assures that there is no temperature gradient between the two webs. Moreover, the air in the pores of the foam material can adapt itself to the higher temperature conditions. During the subsequent laminating of the foam web, in the duct, to the laminating composition present in the gel state, the materials are in physical equilibrium. During subsequent processing they show practically identical expansion behavior, so that a satisfactory, bubble-free bond is obtained between the polyurethane foam layer and the laminating composition upon further heating during which the laminating composition reacts to completion. At temperatures of about 130°–150°C, required for the complete reaction of the laminating composition, the lacquer layer assumes the hardened final state and only then possesses the required aging resistance.

As it emerges from the drying duct, the compound product is quickly cooled to about 20°C, for example through cooling rolls, whereby the cover layer is additionally anchored physically by the occurring suction effect of the cooled air in the foam material. The sealed foam web can subsequently be coiled as a roll while the auxiliary support, which is anti-adhesive toward the lacquer layer, is being removed.

The lacquer layer sealing the foam material receives its surface relief in accordance to that of the auxiliary support, i.e., foil, paper, embossed carrier of different reliefs, etc. In the case of smooth foils as auxiliary supports, the surface of the lacquer layer is mirror-polished and reflects light.

The foam web, now provided with a dense protective layer on one side, can be sealed in the same way on the other side. The advantages of the new process are then even more evident, because the harmful bubble formation can be further avoided. Such foam webs which are sealed on both sides are particularly suitable, in thin form of comparatively high compressed foam material, as a support material for so-called adhesive mounting tapes which, when coated in known manner on both sides with a highly cohesive and adhesive gluing composition, can be used in many ways for the attachment of objects. They fulfill the high requirements demanded of support material with respect to load capacity and aging resistance.

Foam webs or strips which are finished to be self-ahesives on one side, usually made from somewhat thicker and less compressed foam material grades, can be used for sealing joints, for padding delicate objects and numerous other applications. The improved aging resistance of the foam material of this invention is another important factor in the one-side adhesive web. Due to the lacquer layer present on the outer side, the foam material is not destroyed even under longer exposure to light. This is especially true when the lacquer layer is colored or painted and equipped with UV absorbers.

The present invention has been set forth in detail using, as an example open-pore polyurethane foam materials. However, it is also applicable to foam webs of other materials, such as polyvinyl chloride, polyethylene, etc. Other applications include porous supports such as fabrics or non-woven webs. The temperature control in the drying duct before and behind the laminating station must then merely be adapted to the special requirements of the particular support and covering material.

The invention will be explained in greater detail below with reference to the examples. However, these are in no way meant as limiting the scope thereof.

EXAMPLE 1

A polyurethane foam strip sealed on one side is produced in the following manner:

A urea-formaldehyde lacquer-forming solution consisting of:

77.6 parts by weight of a urea-formaldehyde resin, etherified with butanol, having an acid number of 15–20 (Plastopal AW, commercial product of BASF)

21.4 parts by weight of a urea-formaldehyde resin, etherified with butanol, having an acid number of 6–10 (Plastopal II, commerical product of BASF)

1.0 part by weight of p-toluene sulfonic acid, dissolved in a mixture of butanol, isopropanol and acetone is applied continuously to a 50 micron polyester foil with a film applicator. The film is cast such that it is 2 microns thick when dried.

The lacquer layer is then dried and partially crosslinked in a conventional convection drying duct for about 2 minutes at about 60 to 120°C. This exposure permits intimate bonding of this lacquer layer or veneer with the adhesive laminating coating which is subsequently applied in a thickness of 25 microns. The laminating coating is a solvent-free reactive, two component mixture which forms a polyurethane. It contains an isocyanate of low viscosity which acts not only as a monomer, but also as a solvent, for the polymerization reaction. The laminating coating has the following composition:

Component A:

73.7 parts by weight of a branched polyether having terminal OH groups and having a molecular weight of 3000 ± 200 and an OH number of 56 ± 3 (Desmophen 3400, commerical product of Bayer AG), 2.0 parts by weight of 2,5-di-tertiary-amylhydroquinone as an aging inhibitor, and 0.6 parts by weight of tin-II-octoate.

Component B:

20.5 parts by weight of a long-chain aliphatic diisocyanate having an equivalent weight of 300 and an isocyanate content of 14% (DDI 1410 of the Schering Company), and 3.2 parts by weight of an aliphatic diisocyanate having an equivalent weight of 105 and an isocyanate content of 40%

(Trimethylhexamethylene-diisocyanate of Veba-Chemie) Since the free isocyanate groups are present in the mixture in a stoichiometric excess, based on the equivalents of OH groups in the polyether, at least a stoichiometric crosslinking of the laminating coating and reaction with the urea-formaldehyde lacquer and foam web are possible.

The mixture ratio of the two components of this laminating coating must be observed exactly. The conveyor units used are precision piston proportioning pumps operating in unison. The components thus conveyed in quantity ratios corresponding to the above formula are mixed homogeneously in a mixing chamber and pass via a spreader onto the partially crosslinked lacquer layer present on the polyester foil.

The coated substrate is then introduced horizontally into a convection drying duct in which a laminating station is positioned. Prior to reaching the laminating station, provided after about 2m in the approximately 8m long duct, the reactive laminating composition containing the two components is crosslinked by increasing heating to 110°C to the extent that approximately ⅔ of the crosslinkage potential are preserved. According to experience, this point is reached when a composition which is stringy upon contact has formed.

Parallel to the coated substrate, the polyurethane foam web to be sealed (thickness 6.3 mm, density 40kg/m³, weight 250 g/m²) is transported in the duct to the laminating station and is there bonded with the coated substrate under light contact pressure. After laminating, while increasing the temperature further to about 150°C, the complete crosslinking of the polyurethane composition and the urea-formaldehyde lacquer takes place.

After the laminate has left the drying duct and has cooled, the polyester auxiliary support is removed and the sealed foam coil to a roll.

EXAMPLE 2

By two successive sealing operations, which are carried out as described in example 1, a polyurethane foam web is sealed on both sides.

Physical Data of the Foam Material:

Weight 300 g/m²; thickness 0.7 mm; density 430 kg/m³; modulus of elasticity $3 \times 10^8$ dyn/cm²; storage-modulus $1.2 \times 10^8$ dyn/cm².

Composition of the Veneer Layer:
47.5 parts by weight of a urea-formaldehyde resin, etherified with butanol, having an acid number of 15–20 (Plastopal AW, commerical product of BASF)
51.5 parts by weight of a urea-formaldehyde resin, etherified with butanol, having an acid number of 6–10 (Plastopal II, commercial product of a BASF)
1.0 part by weight of p-toluenesulfonic acid The composition of the elastomeric laminating layer is the same as in example 1.

A bilaterally sealed polyurethane foam material is obtained which has the excellent deformation-mechanical properties of the unsealed foam material. It is especially well suited for the production of a doubly coated adhesive web because of its smooth surfaces and the resulting optimum adhesive characteristics.

For this purpose the foam web is coated on both sides with an self-adhesive composition based on a known copolymer of iso-octyl-acrylate and acrylic acid. The coated web is subjected to a bending moment stress by the following testing method.

In principle, the test comprises adhering one side of the doubly coated web to a vertically mounted fixed plate, and the other to an outer plate having a horizontally-extending rod projecting form its center. A weight is suspended from the outer extremity of the rod and the separation time between the plates is measured.

The outer plate is square, with a 30 mm edge, and is of 3 mm thick V2A stainless steel. The inner side, to which the adhesive web is to be applied is polished on a lathe. The other side of the plate is provided with a 5 mm thick steel bar which is perpendicular to the plane of the plate and measures 87 mm. Hence, the distance from the inner face of plate to the end of the bar is 90 mm. At the end of the bar is provided a hook for suspending a weight.

The fixed plate is also of V2A stainless steel and is about 2 mm thick. Unlike the outer plate, the surface of the inner plate to be exposed to the adhesive is polished with a standard abrasive (emery paper, FEPA grain size 240). The plate is polished such that the grinding lines are parallel to the longitudinal direction.

The polished surfaces of both plates are thoroughly cleaned with benzene before the test, the plates having been submerged in toluene for several hours, to remove all traces of oil or grease.

A piece of the adhesive web to be tested, covered with separating paper on one side and the adhesive exposed on the other, is applied to the polished surface of the outer plate. The protruding edges of web are removed with a razor blade. Then the separating paper is removed and the outer plate is fastened to the polished side of the fixed plate. The grinding lines of the fixed plate must extend vertically.

The plates are then passed together for 1 minute with a pressure of about 10 kp per cm² and then immediately loaded with a weight. The test is carried out at 22°C and 55% relative humidity, the adhesive web having previously been held under these conditions for several hours.

The web tested in this manner gave holding times of 6000–7000 minutes at a load of 800 p.

Comparative Examples:

The same starting materials in the same quantity were used for the productions of doubly coated adhesive strips as in example 2, but the foam material was sealed by other prior art methods. The products obtained were tested as described above.

1. The lacquer-forming layer was applied on the foam material by direct spreading and then freed from solvent in the drying duct and cross-linked.

Holding time at 800 p load: about 250 min

2. The lacquer-forming layer was spread on the auxiliary support, freed from the solvent in a drying duct and crosslinked and combined immediately after the duct with the foam material supplied cold under pressure.

Holding time at 800 p load: about 1000 min

3. The lacquer-forming layer was applied on a polyester foil, as described in example 1, and after removal of the solvent coated with the solvent-free polyurethane laminating composition. And after that passed through the drying duct such that after emergence from the duct the laminating composition remained about ⅔ uncrosslinked.

This substrate was cooled to about room temperature and laminated to the foam material under light pressure. The compound product was introduced into a convection drying duct having a temperature of 100°–120°C and allowed to crosslink to completion. This temperature range was chosen because at lower temperatures, apart from the long residence times in the duct and the slow manufacturing speed resulting therefrom, the polyurethane laminating composition remains in a low-viscous state too long and hence penetrates too deeply into the pores of the foam material.

Holding time at 800 p load: about 750 min.

What is claimed is:

1. A sealed foam web which comprises a web of polyurethane, polyvinyl chloride or polyethylene foam, at least one side of which is covered with an adhesive intermediate layer of elastic polyurethane, said intermediate layer being bonded to said web and to a thin, hard thermosetting plastic sealing layer of a urea-formaldehyde resin or a melamine resin.

2. A web according to claim 1 wherein said sealing layer is up to 10 microns in thickness, and said intermediate layer is up to 70 microns in thickness.

3. The sealed web of claim 1 in which both sides of said web are covered with said adhesive and sealing layers.

4. The sealed web of claim 1 in which said polymeric foam is polyurethane.

5. The sealed web of claim 1 in which said sealing layer is a urea-formaldehyde resin and said adhesive layer is polyurethane.

6. The sealed web of claim 1 in which the sealed layer is a melamime resin blended with an alkyd resin.

7. An adhesive web comprising the sealed web of claim 1 in which the sealing layer is coated with an adhesive composition.

8. An adhesive web comprising the sealed web of claim 3 in which both sealing layers are coated with an adhesive.

* * * * *